United States Patent [19]

Suzuki et al.

[11] Patent Number: 5,035,780

[45] Date of Patent: Jul. 30, 1991

[54] METHOD OF MANUFACTURING A PLATINUM TIP

[75] Inventors: Teruo Suzuki; Kenichi Ogawa, both of Tokyo; Hiroshi Murakami, Tsukuba, all of Japan

[73] Assignees: Agency of Industrial Science and Technology; Seiko Instruments Inc., both of Japan

[21] Appl. No.: 328,029

[22] Filed: Mar. 23, 1989

[30] Foreign Application Priority Data

Mar. 25, 1988 [JP] Japan .............................. 63-71084
Nov. 15, 1988 [JP] Japan ............................. 63-289064

[51] Int. Cl.$^5$ .............................................. C25F 3/16
[52] U.S. Cl. ......................... 204/129.35; 204/129.55; 204/129.95; 156/664; 51/285 R
[58] Field of Search ..................... 204/129.55, 129.75, 204/129.95, 129.35; 420/466; 156/654, 659.1, 664; 51/285

[56] References Cited

U.S. PATENT DOCUMENTS 2,430,028 11/1947 Pfann et al. ................ 204/129.55 X
2,476,965 7/1949 Emerson et al. ........... 204/129.35 X
4,181,882 1/1980 Isaacs ............................. 204/404 X
4,495,039 1/1985 Cerise et al. ........................ 204/130

FOREIGN PATENT DOCUMENTS 2003168 7/1971 Fed. Rep. of Germany ...... 420/466
508054 5/1971 Switzerland .................... 204/129.55

*Primary Examiner*—Donald R. Valentine
*Attorney, Agent, or Firm*—Bruce L. Adams; Van C. Wilks

[57] ABSTRACT

In the production of a tunneling probe tip having a sharp point by utilizing electropolishing, the present invention has enabled the production of a platinum tunneling probe tip always produceable in an identical conical form having high point sharpness without scattering in the shape caused by the anisotropy of crystal face with respect to the rate of polishing during polishing of a platinum material through adoption of a two-stage polishing process, which comprises subjecting a platinum tunneling probe tip material to a primary polishing for primary shaping of the tunneling probe tip material into a tunneling probe tip form, and then subjecting the shaped material to a secondary polishing for sharpening of the point with a mixed acid comprising sulfuric acid, nitric acid, and phosphoric acid.

16 Claims, 1 Drawing Sheet

× 100

× 3000

METHOD OF MANUFACTURING A PLATINUM TIP

BACKGROUND OF THE INVENTION

1. Field of the Invention

The present invention relates to a process for producing a platinum tunneling probe tip having a sharp point for use in FE-SEM, STM, and an ion beam electrode.

2. Description of the Related Art

The production of a tunneling probe tip having a sharp point by electropolishing has heretofore been conducted on tungsten, TiC, tantalum, etc. With respect to platinum, it is known that the polishing can be conducted by electrolysis with some cyanide solution (see FIG. 1).

However, with respect to the electropolishing of platinum, since the crystal grain of a platinum tunneling probe tip material is large as opposed to tungsten, TiC, tantalum, etc., the grain boundary is selectively polished, which raises problems with poor reproducibility, such as occurrence of scattering, in the shape due to the anisotropy of the crystal face with respect to the rate of polishing and difficulty in sharpening the point.

SUMMARY OF THE INVENTION

It is the primary object of the present invention to provide a method of manufacturing a platinum tunneling probe tip having a sharp point always produceable in an identical form through elimination of the above-mentioned drawback.

In accordance with the present invention, there is provided a method of manufacturing a platinum tunneling probe tip comprising subjecting platinum material to a mechanical polishing, or to primary electropolishing with a sodium cyanide or potassium cyanide solution and subjecting the treated platinum material to secondary electropolishing milling with a mixed acid comprising sulfuric acid, nitric acid, and phosphoric acid.

In the above-described electropolishing, the point of a platinum tunneling probe tip material is sharpened to a certain extent by the first stage electrolysis with a sodium cyanide or potassium cyanide solution to be formed into a sharp point, and the point is further sharpened by the second stage electrolysis with a mixed acid, which makes it possible to produce a platinum tunneling probe tip with high reproducibility.

DESCRIPTION OF THE PREFERRED EMBODIMENTS

The present inventors have made various studies on electropolishing of a platinum tunneling probe tip material and, as a result, have found that electrolysis with a mixed acid comprising sulfuric acid, nitric acid, and phosphoric acid can provide excellent polishing finish with less influence of crystal grin of the platinum tunneling probe tip material. In view of the fact that the platinum tunneling probe tip cannot be sharpened by the above electropolishing unless the tip has a point sharpened to a certain extent, the present invention adopted a two-stage electropolishing process in the electrolysis wherein the electropolishing with the above-described mixed acid is conducted after a primary electropolishing with a sodium cyanide or potassium cyanide solution.

The present invention will now be described in more detail with reference to the following examples.

EXAMPLE 1

A 0.3 mm $\phi$-pure platinum wire as a tunneling probe tip material was degreased and washed with water. Then, the point portion of the tunneling probe tip material was immersed in a KCN solution to conduct first-stage electropolishing.

(First-stage electrolysis conditions)
electrolyte: 1M KCN
electrolyzing voltage: 2–20 V AC
plate: platinum
electrolyzing time: 3–20 min After washing with water, a second-stage electropolishing was conducted with the following mixed acid to produce a platinum tunneling probe tip having a sharp point.

(Second-stage electrolysis conditions)
Composition of electrolyte:
sulfuric acid: 1 volume
nitric acid: 1 volume
phosphoric acid: 1 volume
electrolyzing voltage: 2–20 V AC
plate: platinum
electrolyzing time: 1–60 min In the electropolishing, it is possible to arbitrarily regulate the sharpness of the point of the tunneling probe tip by varying the electrolyzing voltage and time.

Figure 1:
FIG. 1 is an exterior view of a platinum tunneling probe tip after electropolishing with a cyanide solution according to the prior art, and FIG. 2 an exterior view of a platinum tunneling probe tip after electropolishing with a mixed acid according to an example of the present invention.
Figure 2:
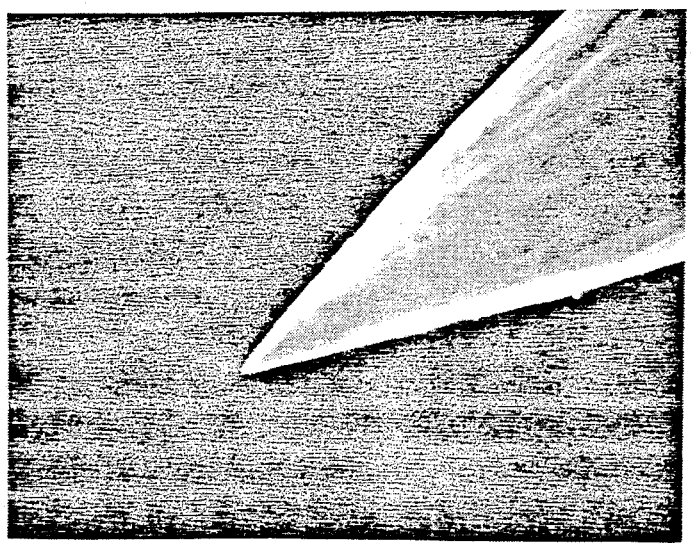

The platinum tunneling probe tip thus formed had a high point-reproducibility and exhibited a stable tunneling probe tip performance (see FIG. 2).

EXAMPLE 2

A 0.3 mm $\phi$-pure platinum wire as a tunneling probe tip material was degreased and washed with water. Then, the point portion of the tunneling probe tip material was immersed in a NaCN solution to conduct first-stage electropolishing.

(First-stage electrolysis conditions)
electrolyte: 1M NaCN
electrolyzing voltage: 2–20 V AC
plate: platinum
electrolyzing time: 3–20 min After washing with water, second-stage electropolishing was conducted with the following mixed acid to produce a platinum tunneling probe tip having a sharp point.

(Second-stage electrolysis conditions)
Composition of electrolyte:
sulfuric acid: 1 volume
nitric acid: 1 volume
phosphoric acid: 2 volumes
electrolyzing voltage: 2–20 V AC
plate: platinum
electrolyzing time: 1–60 min In the electropolishing, it is possible to arbitrarily regulate the sharpness of the point of the tunneling probe tip by varying the electrolyzing voltage and time.

As with the platinum tunneling probe tips formed in Example 1, the platinum tunneling probe tips thus formed had a high point reproducibility and exhibited a stable tunneling probe tip performance.

EXAMPLE 3

A 0.3 mm $\phi$-platinum tunneling probe tip material was subjected to a first-stage electropolishing with a KCN solution in the same procedure as that of Example 1, and then subjected to a second-stage electropolishing with the following mixed acid.

(Second-stage electrolysis conditions)
Composition of electrolyte:
sulfuric acid: 10%
nitric acid: 5%
phosphoric acid: 10%
electrolyzing voltage: 2-20 V AC
plate: platinum
electrolyzing time: 1-60 min In the electropolishing, it is possible to arbitrarily regulate the sharpness of the point of the tunneling probe tip by varying the electrolyzing voltage and time.

As with the platinum tunneling probe tips formed in Example 1, the platinum tunneling probe tips thus formed had a high point reproducibility and exhibited a stable tunneling probe tip performance.

With respect to the electrolysis conditions according to the present invention, the concentration of the electrolyte for the first-stage electrolysis (sodium cyanide or potassium cyanide) may be in any range besides the concentration used in the above-described Examples so long as the other conditions are properly selected. However, the concentration of the electrolyte is preferably 0.3 to 5M from the viewpoint of the rate of polishing. Although it is preferred that the mixed acid be free from water and comprise sulfuric acid, nitric acid, and phosphoric acid, an excellent polishing effect can be attained as far as the mixed acid comprises at least 10% of sulfuric acid, at least 5% of nitric acid, and at least 10% of phosphoric acid. Further, it is also possible to conduct surface regulation through cathode electrolysis with an acid solution after the second-stage electropolishing according to the present invention.

In a preferred embodiment, the platinum base material comprises at least 99.9% of Pt and 0.005% or less of copper with the balance being unavoidable ingredients and has a crystal grain diameter regulated to 10 to 200 $\mu$m from the viewpoint of removing the factors inhibiting the polishing to form the point of a tunneling probe tip with a crystal grain having a suitable size.

With respect to the method of producing a tunneling probe tip having a sharp point after a mechanical polishing or primary electropolishing for shaping a tunneling probe tip material into a macroscopic tunneling probe tip, a secondary electropolishing milling with a polishing solution composed of sulfuric acid nitric acid, and phosphoric acid is conducted.

Various elements besides Pt are present as unavoidable ingredients in the platinum material and they remarkably spoil the electropolishing performance through selective dissolution thereof during electropolishing, although this tendency depends upon the content and kind of the element. In particular, Cu has a large influence of this type, and it is therefore preferred that the Cu content be 0.005% or less.

The polishing solution comprising sulfuric acid, nitric acid, and phosphoric acid is suited for fine polishing, and it is difficult to directly shape a tunneling probe tip material into a tunneling probe tip form by making use of this polishing solution. Therefore, it is necessary to previously shape the tunneling probe tip material into a macroscopic tunneling probe tip form through mechanical polishing or electropolishing in a cyanide bath or the like.

EXAMPLE 4

A 0.3 mm $\phi$-platinum wire was prepared from a platinum material comprising at least 99.9% of Pt and 0.005% of Cu with the balance being unavoidable ingredients such as Mn, Mg, Fe, Zn, Pd, Au, Ag and Rh through a step of wire drawing. The platinum wire was heat treated in vacuo at 700° C. for 30 min, and then gradually cooled to prepare a platinum tunneling probe tip material having a crystal grain diameter of 10 to 100 $\mu$m. The platinum tunneling probe tip material was shaped by mechanical polishing into a macroscopic tunneling probe tip form having a polishing angle of 30°. Thereafter, the shaped tunneling probe tip material was degreased and washed with water and then subjected to electropolishing with the following polishing solution.

Polishing solution:
sulfuric acid-nitric acid-phosphoric acid (1:1:1)
Electrolysis conditions:
voltage: 2-20 V AC
time: 1-60 min
plate: platinum The tunneling probe tip thus formed had a sharp point and exhibited excellent performance when used as a platinum tunneling probe tip for STM.

EXAMPLE 5

A 0.3 mm $\phi$-platinum wire was prepared from a platinum material comprising at least 99.9% of Pt and 0.0025% or less of Cu with the balance being unavoidable ingredients such as Mg, Mn, Fe, Zn, Pd, Au, Ag and Rh through a step of wire drawing. The platinum wire was heat treated in vacuo at 800° C. for 30 min and then gradually cooled to prepare a platinum material having a crystal grain diameter of 10 to 150 $\mu$m. The point portion of the platinum tunneling probe tip material thus prepared was immersed in the following polishing solution and subjected to electropolishing to shape the material into a macroscopic tunneling probe tip form.

Polishing solution:
1M KCN solution
Electrolysis conditions:
voltage: 2-20 V AC
plate: platinum
time: 3-20 min Thereafter, the shaped tunneling probe tip material was washed with water, and subjected to electropolishing with a polishing solution comprising sulfuric acid, nitric acid and phosphoric acid in the same manner as that of Example 1.

The tunneling probe tip thus formed had a sharp point and exhibited excellent performance when used as a platinum tunneling probe tip for STM.

EXAMPLE 6

Three kinds of 0.3 mm $\phi$-platinum wires were prepared from platinum materials each having a Pt content of 99.9% and different in the contents of the remaining Cu and unavoidable ingredients (see Table 1) through a step of wire drawing.

The heat treatment, electropolishing with a potassium cyanide solution, and further electropolishing with a sulfuric acid-nitric acid-phosphoric acid solution were conducted by making use of the above-prepared platinum wires as the tunneling probe tip material in the same manner as that of Example 2. The shape of the point of each platinum tunneling probe tip thus formed was observed. As a result, it has been found that the tunneling probe tips prepared by using platinum materials each having a Pt content of 99.9% or more and a Cu content of 0.005% or less (materials A and B) according to the present invention had a very sharp point and exhibited excellent performance when used as a tunneling probe tip for STM. By contrast, the tunneling probe tip prepared by using a material having a Cu content exceeding 0.005% (material C) had no sharp point because of high rate of polishing.

TABLE 1

Chemical ingredients of Platinum material

| chemical ingredients | tunneling probe tip material | | unit: % |
|---|---|---|---|
|  | A | B | C |
| Pt | 99.9 | 99.9 | 99.9 |
| Cu | 0.00135 | 0.00046 | 0.00701 |
| Mn | 0.000015 or less | 0.000028 | 0.000015 or less |
| Fe | 0.00059 | 0.00323 | 0.00081 |
| Mg | 0.000041 | 0.00015 | 0.000045 or less |
| Zn | 0.000540 | 0.00049 | 0.00047 |
| Pd | 0.00428 | 0.00225 | 0.00366 |
| Ba | 0.000003 or less | 0.00048 | 0.000003 or less |
| Au | 0.00160 | 0.00197 | 0.00244 |
| Rh | 0.0009 or less | 0.0009 or less | 0.0009 or less |
| others | balance | balance | balance |

Although the present embodiments were described with reference to the Examples wherein a polishing solution comprising sulfuric acid, nitric acid and phosphoric acid in a ratio of 1:1:1 was used, the same polishing performance can be attained when the polishing solution comprises at least 10% of sulfuric acid, at least 5% of nitric acid and at least 10% of phosphoric acid.

As described above, the present invention enables production of a platinum tunneling probe tip with a high reproducibility and a high point sharpness which has not been attained in the prior art.

The present invention exhibits a particularly excellent effect when used for the fabrication of a platinum tunneling probe tip for STM.

What is claimed is:

1. A method of manufacturing a platinum tip having a sharp point, which comprises the steps of: subjecting a platinum material to primary polishing to form a sharp point portion, and subjecting the treated platinum material to secondary electropolishing with a mixed aid comprising sulfuric acid, nitric acid, and phosphoric acid to further sharpen the sharp point portion.

2. A method as claimed in claim 1; wherein the primary polishing comprises a mechanical polishing.

3. A method as claimed in claim 1; wherein the primary polishing comprises an electropolishing with a sodium cyanide or potassium cyanide solution.

4. A method as claimed in claim 1; wherein the platinum material is composed of at least 99.9% of Pt and 0.005% or less of Cu with the balance being unavoidable ingredients such as Mg, Mn, Fe, Zn, Pd, Au, Ag, and Rh.

5. A method as claimed in claim 4; wherein the platinum material has a crystal grain diameter of 10–200 μm.

6. A platinum tip having a sharp point formed by electropolishing a platinum compound material, wherein the platinum compound material is composed of at least 99.9% of Pt and 0.005% or less of Cu with the balance being unavoidable ingredients such as Mg, Mn, Fe, Zn, Pd, Au, Ag, and Rh.

7. A platinum tip as claimed in claim 6; wherein the platinum compound material has a crystal grain diameter of 10–200 μm.

8. A method of producing a platinum probe tip, comprising the steps: providing a piece of platinum base material; subjecting the piece of platinum base material to a first-stage polishing to shape the piece into the form of a probe tip having a point; and subjecting the shaped piece of platinum base material to a second-stage polishing with an acid mixture containing sulfuric acid, nitric acid and phosphoric acid to sharpen the point of the probe tip.

9. A method according to claim 8; wherein the first-stage polishing comprises mechanical polishing.

10. A method according to claim 8; wherein the first-stage polishing comprises electropolishing.

11. A method according to claim 10; wherein the electropolishing is carried out with a solution of sodium cyanide or potassium cyanide.

12. A method according to claim 8; wherein the acid mixture comprises at least 10% sulfuric acid, at least 5% nitric acid and at least 10% phosphoric acid.

13. A method according to claim 8; wherein the piece of platinum base material is composed of at least 99.9% platinum and not more than 0.005% copper.

14. A method according to claim 13; wherein the platinum base material has a crystal grain diameter in the range 10–200 μm.

15. A platinum probe tip, comprising: a piece of platinum base material having an electropolished sharp point, the platinum base material being comprosed of at least 99.9% platinum and not more than 0.005% copper.

16. A platinum probe tip according to claim 15; wherein the platinum base material has a crystal grain diameter in the range 10–200 μm.

* * * * *